UNITED STATES PATENT OFFICE.

FREDERICK W. HUBER AND FRANK F. REATH, OF RIVERSIDE, CALIFORNIA.

PROCESS OF PRODUCING CEMENT AND RECOVERING POTASSIUM COMPOUNDS.

1,219,315.  Specification of Letters Patent.  Patented Mar. 13, 1917.

No Drawing.  Application filed September 26, 1916.  Serial No. 122,295.

*To all whom it may concern:*

Be it known that we, FREDERICK W. HUBER and FRANK F. REATH, citizens of the United States, residing at Riverside, in the county of Riverside and State of California, have invented certain new and useful Improvements in Processes of Producing Cement and Recovering Potassium Compounds, of which the following is a specification.

The present invention relates to improvements in the manufacture of cement and the recovery of by-products, particularly salts of potassium, by a method involving certain features in common with our U. S. Patent No. 1,194,344.

In the burning of Portland cement, from ordinary cement making materials, and particularly in rotary kilns, where a rather strong gas current is employed, there is always produced a considerable amount of flue dust, which material ordinarily carries the larger part of the alkalis and oxides of sulfur contained in the raw mix. Various processes have heretofore been proposed for the recovery of the alkalis contained therein, but most of these processes have not been entirely satisfactory.

The most satisfactory attempt with which we are familiar consists in mixing this flue dust with sufficient aluminous, silicious or calcareous material, or material having two or more of these properties, to produce a material suitable for use as a cement raw mix, and thereafter calcining or reburning such mixture.

This second calcination, or reburning, does not completely decompose the oxides of sulfur, nor does it completely liberate the alkali metals, and two large a portion of the oxides of sulfur and salts of the alkali metals remain in the clinker. One result is that, aside from the loss of alkali metals, that the cement produced by grinding such clinker is too high in oxides of sulfur, and in alkali metals (sodium and potassium salts of oxides of sulfur) to be safe for use as cement for structural purposes.

The following table shows analyses of various materials used and made, in experiments conducted on this process:

| No. |  | $SiO_2$ | $R_2O_3$ | CaO. | $K_2O$. | $Na_2O$. | S. |
|---|---|---|---|---|---|---|---|
| 1 | Original raw mix.. | 14.04 | 5.78 | 43.38 | 0.48 | 0.28 | 0.03 |
| 2 | Flue dust made during burning raw mix......... | 14.72 | 6.75 | 50.90 | 2.52 | 1.49 | 3.51 |
| 3 | Dust made during burning first flue dust (with clay, etc.)............ | 4.70 | 3.36 | 21.20 | 21.28 | 8.85 | 12.40 |
| 4 | Clinker made from first flue dust (with clay, etc.). | 20.58 | 8.68 | 59.49 | 2.66 | 1.56 | 1.65 |

In the above table No. 4 shows the clinker produced by burning the original dust (that is to say on material No. 2), after correcting its composition to form a normal raw mix, and it will be noted that this material is excessively high in alkalis and oxides of sulfur.

We have now discovered that it is possible to completely decompose and liberate the oxides of sulfur and the alkali metals contained in the flue dust, by a process which involves a modification of the process above described, and certain features in common with our U. S. Patent No. 1,194,344 above referred to.

In this process the original raw material is calcined in rotary kilns in the ordinary manner, thereby producing cement clinker, and the flue dust so produced is recovered, which dust contains most of the alkali metals and most of the oxides of sulfur contained in the original raw mix, and those derived from fuel, and which dust may correspond substantially to the material No. 2 above described. To this material is added a substance capable of readily liberating the alkali metals in a somewhat volatile state, such a material as finely divided calcium fluorid being, so far as we have found, the most effective material for this purpose.

To the flue dust, then, is added an amount of calcium fluorid substantially equivalent to the amount of alkali metals present in the flue dust, together with sufficient argillaceous or calcareous material (or both) to bring the composition up to that of a normal cement raw mix. This mixture is then calcined and clinkered, for example in the ordinary type of rotary kiln, and from this burning there results a clinker, and a second flue dust. This clinker is in all respects a perfectly good cement clinker, although produced from materials extremely high in alkalis and oxids of sulfur. An analysis of a particular example of this clinker, produced from material having the analysis of No. 2, together with calcium fluorid and about 8% of clay, is given below.

| No. | | SiO₂. | R₂O₃. | CaO. | K₂O. | Na₂O. | S. |
|---|---|---|---|---|---|---|---|
| 5 | Clinker.... | 22.41 | 9.46 | 64.62 | 0.03 | Trace. | Trace. |

The flue gases were cooled, and the flue dust produced (second flue dust) was found to contain considerable quantities of sodium and potassium fluorids, some sulfites, sulfates, lime and other materials. To recover the fluorin from this material, we preferably add to the flue dust (if it does not already contain a sufficient amount thereof) salts or other compounds of calcium, such as the oxid or sulfate of calcium or the like, and digest the whole mixture with water, preferably in a heated condition, until substantially all of the fluorin present has been converted into calcium fluorid, while substantially all of the potassium and sodium salts become dissolved, for example as sodium and potassium sulfates. The solid is then separated from the liquid, for example by filtration or sedimentation, the liquid evaporated for the recovery of the alkali metal salts, and the solid material containing calcium fluorid, is employed for treating a further batch of the first flue dust, as above described.

The process of the present invention is particularly adapted to the preparation of cement from the ordinary raw materials whose potassium content is sufficient to make its recovery an economic factor, and to feldspathic and other rocks of high potassium content and of suitable chemical composition for cement making.

What we claim is:

1. A process of recovering alkalis from by-products comprising finely divided silicious, calcareous products containing alkali salts of sulfur-and-oxygen-containing acids, which comprises mixing such material with a fluorid of an alkaline earth metal, and then heating the mixture to a cement-forming temperature, under conditions capable of promoting the liberation and volatilization of alkali metal compounds.

2. A process of treating cement kiln flue dust containing materially more alkali sulfate than a normal Portland cement raw mix, which comprises mixing such dust with a quantity of a haloid salt of an alkali earth metal, and calcining the mixture at a cement-forming temperature.

3. The step of working up a flue dust derived from the burning of cement, by mixing the same with a material containing a fluorid, and clinkering the mixture.

4. The process which comprises burning cement-forming materials containing alkali metal compounds, collecting the flue dust thereby produced, mixing the same with a haloid salt of an alkaline earth metal, again calcining and collecting a second flue dust, digesting said second flue dust with water in the presence of an alkaline earth compound and thereafter separating the aqueous liquid containing at least the major portion of the alkali in the form of water-soluble compounds from the calcareous residue.

5. The process which comprises calcining a raw cement mix containing material amounts of potash, and collecting a potassiferous flue dust, mixing such dust with a material containing calcium fluorid, calcining such mixture and collecting a second flue dust, treating such second flue dust with water in the presence of calcium compounds, separating the liquid from the solid materials, and recovering a potassium compound from the liquid.

6. In the treatment of cement flue dust, the steps of heating such dust with a material containing alkaline earth metal fluorid, to vaporize alkali metal fluorid, treating the product, with a salt of an alkaline earth metal and water, whereby an insoluble product containing alkaline earth metal fluorid is produced, adding such insoluble product to a further quantity of such flue dust, and repeating the cycle of operations.

7. In the manufacture of cement, the improvement which comprises mixing a flue dust containing alkali, with a sufficient quantity of an alkali earth fluorid to furnish fluorin equivalent for the alkali present, and with a sufficient quantity of other materials to form a normal cement mix, and calcining the mixture at a cement-forming temperature.

8. In the treatment of alkali-containing flue dust, the step of calcining a mixture comprising such a dust, an alkaline earth metal fluorid and such other materials as may be necessary to produce a substantially normal cement mix.

In testimony whereof we affix our signatures.

FREDERICK W. HUBER.
FRANK F. REATH.